(12) United States Patent
Fujishiro

(10) Patent No.: US 12,432,631 B2
(45) Date of Patent: *Sep. 30, 2025

(54) HANDOVER CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,276

(22) Filed: Jun. 24, 2024

(65) Prior Publication Data

US 2024/0349133 A1    Oct. 17, 2024

Related U.S. Application Data

(63) Continuation of application No. 17/483,384, filed on Sep. 23, 2021, now Pat. No. 12,047,825, which is a
(Continued)

(30) Foreign Application Priority Data

Mar. 25, 2019  (JP) ................................. 2019-056187

(51) Int. Cl.
*H04W 36/00* (2009.01)
*H04W 36/08* (2009.01)
*H04W 36/36* (2009.01)

(52) U.S. Cl.
CPC .  *H04W 36/00837* (2018.08); *H04W 36/0061* (2013.01); *H04W 36/00835* (2018.08); *H04W 36/08* (2013.01); *H04W 36/362* (2023.05)

(58) Field of Classification Search
CPC ......... H04W 36/0061; H04W 36/0079; H04W 36/00835; H04W 36/00837; H04W 36/08; H04W 36/36

(Continued)

(56) References Cited

U.S. PATENT DOCUMENTS 9,100,858 B2    8/2015  Chang et al.
9,155,014 B2   10/2015  Tenny et al.
(Continued)

FOREIGN PATENT DOCUMENTS

CN       107113673 A     8/2017
JP    2013-243741 A    12/2013
(Continued)

OTHER PUBLICATIONS

3GPP Organizational Partners, "LTE, E-UTRAN, stage 2, radio, architecture", 3GPP TS 36.300 V15.4.0; Dec. 2018, pp. 1-363; Valvonne, France.

(Continued)

*Primary Examiner* — Robert J Lopata
(74) *Attorney, Agent, or Firm* — Studebaker Brackett PLLC

(57) ABSTRACT

A handover control according to a first aspect is a method for performing conditional handover of user equipment from a source cell to which the user equipment is connected to a target cell. The handover control method comprises receiving, by the user equipment, from the source cell, an RRC message for handover, the RRC message including identifiers of a plurality of candidate cells being candidates for the target cell; and transmitting, by the user equipment, a report message including information related to a radio link failure detected in the source cell, to a cell to which the user equipment connects after the radio link failure. The report message includes the identifiers of all the candidate cells included in the RRC message.

7 Claims, 10 Drawing Sheets

Related U.S. Application Data continuation of application No. PCT/JP2020/011858, filed on Mar. 17, 2020.

(58) Field of Classification Search
USPC .......................................................... 370/329
See application file for complete search history.

(56) References Cited

U.S. PATENT DOCUMENTS

| | | | |
|---|---|---|---|
| 9,420,621 B2 | 8/2016 | Chang et al. | |
| 9,521,565 B2 | 12/2016 | Tenny et al. | |
| 9,622,140 B2 | 4/2017 | Kida et al. | |
| 9,883,427 B2 | 1/2018 | Murakami et al. | |
| 9,961,709 B2 | 5/2018 | Chang et al. | |
| 2015/0131613 A1* | 5/2015 | Jung | H04W 24/10 370/331 |
| 2015/0373602 A1* | 12/2015 | Hampel | H04W 36/0016 455/437 |
| 2016/0219473 A1* | 7/2016 | Teyeb | H04W 36/0064 |
| 2017/0142621 A1* | 5/2017 | Lu | H04W 36/085 |
| 2018/0227805 A1* | 8/2018 | Jang | H04W 28/26 |
| 2020/0045602 A1* | 2/2020 | Jiang | H04W 36/0058 |
| 2020/0077314 A1* | 3/2020 | Hwang | H04W 76/27 |
| 2020/0154330 A1* | 5/2020 | Paladugu | H04W 36/026 |
| 2021/0029600 A1* | 1/2021 | Balan | H04W 36/0094 |
| 2021/0105672 A1* | 4/2021 | Hwang | H04W 36/362 |
| 2021/0120471 A1* | 4/2021 | Choi | H04W 36/00837 |
| 2021/0235342 A1* | 7/2021 | Zhu | H04W 36/00838 |
| 2021/0337443 A1* | 10/2021 | Chang | H04W 36/0058 |
| 2022/0070752 A1* | 3/2022 | Kim | H04W 24/08 |
| 2023/0180083 A1* | 6/2023 | Shi | H04W 36/00838 370/331 |

FOREIGN PATENT DOCUMENTS

| | | |
|---|---|---|
| JP | 2014-007633 A | 1/2014 |
| JP | 2014-112809 A | 6/2014 |
| JP | 2016-119539 A | 6/2016 |
| JP | 2017-108413 A | 6/2017 |

OTHER PUBLICATIONS

Samsung Electronic, "Configuration management aspects in conditional handover for LTE", 3GPP-RAN WG2 #105 meeting; R2-1902075; Jan. 22-26, 2019; pp. 1-3; Athens, Greece.

* cited by examiner

HANDOVER CONTROL METHOD

RELATED APPLICATIONS

This application is a Continuation Application of U.S. patent application Ser. No. 17/483,384, filed Sep. 23, 2021, which is a continuation based on PCT Application No. PCT/JP2020/011858, filed on Mar. 17, 2020, which claims the benefit of Japanese Patent Application No. 2019-056187 filed on Mar. 25, 2019. The content of which is incorporated by reference herein in their entirety.

TECHNICAL FIELD

The present disclosure relates to a handover control method.

BACKGROUND ART

In a mobile communication system, user equipment is handed over in conjunction with movement of the user equipment to change a cell to which the user equipment is connected from a source cell to a target cell (for example, see NPL 1). In recent years, there has been a desire to reduce communication interruption time during handover and to improve reliability of handover in an environment in an unstable radio state.

CITATION LIST

Non-Patent Literature

NPL 1: 3GPP Technical Specification "TS36.300 V15.4.0" January 2019

SUMMARY

A handover control method according to a first aspect is a method for performing conditional handover of user equipment from a source cell to which the user equipment is connected to a target cell. The handover control method comprises receiving, by the user equipment, from the source cell, an RRC message for handover, the RRC message including identifiers of a plurality of candidate cells being candidates for the target cell; and transmitting, by the user equipment, a report message including information related to a radio link failure detected in the source cell, to a cell to which the user equipment connects after the radio link failure. The report message includes the identifiers of all the candidate cells included in the RRC message.

A user equipment according to a second aspect is a user equipment comprising a processor and a memory coupled to the processor, the processor configured is configured to: receive, from a source cell, an RRC message for handover, the RRC message including identifiers of a plurality of candidate cells being candidates for a target cell; and transmit a report message including information related to a radio link failure detected in the source cell, to a cell to which the user equipment connects after the radio link failure. The report message includes the identifiers of all the candidate cells included in the RRC message.

A chipset according to a third aspect is a chipset for controlling a user equipment. The chipset is configured to execute processes of: receiving, from a source cell, an RRC message for handover, the RRC message including identifiers of a plurality of candidate cells being candidates for a target cell; and transmitting a report message including information related to a radio link failure detected in the source cell, to a cell to which the user equipment connects after the radio link failure. The report message includes the identifiers of all the candidate cells included in the RRC message.

A non-transitory computer-readable medium according to a fourth aspect is a non-transitory computer-readable medium comprising, stored thereupon, computer program instructions for execution by a user equipment. The program instructions is configured to cause the user equipment to execute processing of: receiving, from a source cell, an RRC message for handover, the RRC message including identifiers of a plurality of candidate cells being candidates for a target cell; and transmitting a report message including information related to a radio link failure detected in the source cell, to a cell to which the user equipment connects after the radio link failure. The report message includes the identifiers of all the candidate cells included in the RRC message.

A system according to a fifth aspect is a system comprising a user equipment configured to: receive, from a source cell, an RRC message for handover, the RRC message including identifiers of a plurality of candidate cells being candidates for a target cell; and transmit a report message including information related to a radio link failure detected in the source cell, to a cell to which the user equipment connects after the radio link failure. The report message includes the identifiers of all the candidate cells included in the RRC message.

DESCRIPTION OF EMBODIMENTS

A mobile communication system according to an embodiment will be described with reference to the drawings. In the description of the drawings, the same or similar parts are designated with the same or similar reference signs.

Configuration of Mobile Communication System

Figure 1:
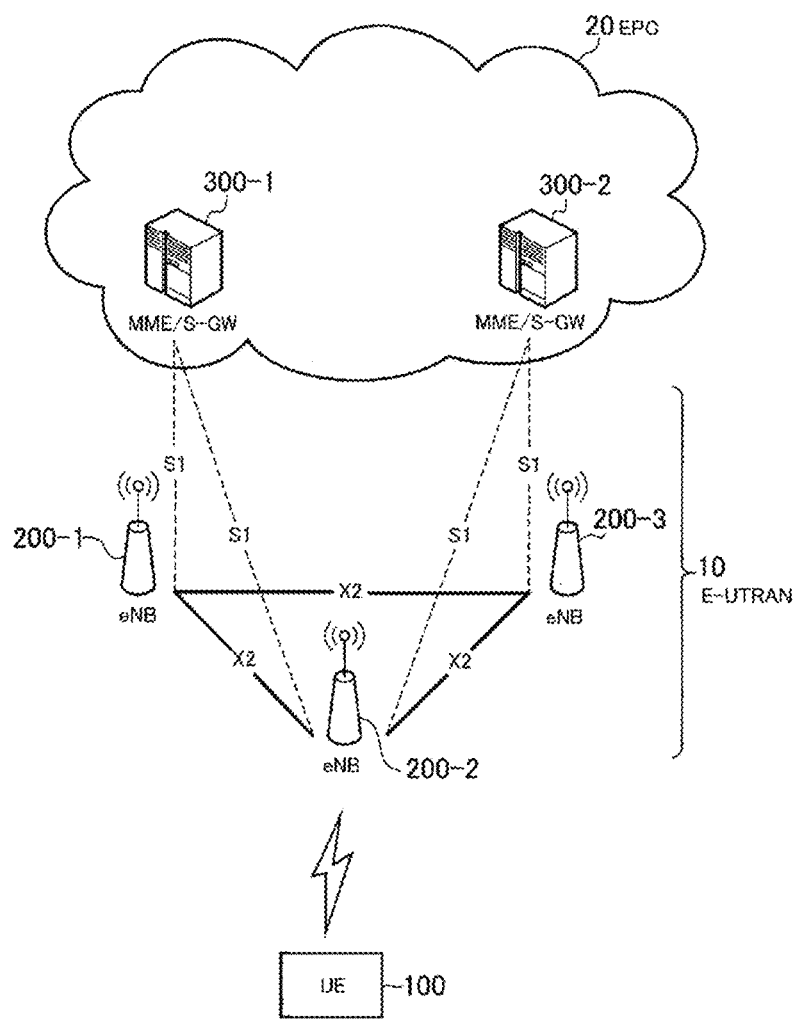
FIG. 1 is a diagram illustrating a configuration of a mobile communication system according to an embodiment.

First, a configuration of a mobile communication system according to an embodiment will be described. FIG. 1 is a diagram illustrating a configuration of a Long Term Evolution (LTE) system corresponding to a mobile communication system according to an embodiment. The LTE system is a system based on the 3rd Generation Partnership Project (3GPP) standard.

Hereinafter, the LTE system is illustrated as a mobile communication system, but a fifth generation (5G) system of the 3GPP standard may be at least partially applied to the mobile communication system.

As illustrated in FIG. 1, the LTE system includes User Equipment (UE) 100, a radio access network (Evolved-UMTS Terrestrial Radio Access Network (E-UTRAN)) 10, and a core network (Evolved Packet Core (EPC)) 20.

In the 5G system, the radio access network is referred to as Next Generation RAN (NG-RAN), and the core network is referred to as a 5G Core Network (5GC).

The UE 100 is a mobile communication apparatus. The UE 100 performs radio communication with an eNB 200 managing a cell (serving cell) in which the UE 100 exists. The UE 100 may be any apparatus utilized by a user. Examples of the UE 100 include a mobile phone terminal (including a smartphone), a tablet terminal, a notebook PC, a sensor, an apparatus provided in a sensor, a vehicle, an apparatus provided in a vehicle (vehicle UE), an air vehicle, and an apparatus provided in an air vehicle (aerial UE).

The E-UTRAN 10 includes a base station (evolved Node-B (eNB)) 200. A plurality of the eNBs 200 are connected to each other via an X2 interface corresponding to an inter-base-station interface. The eNB 200 manages one or a plurality of cells. The eNB 200 performs radio communication with the UE 100 that has established connection to a cell of the eNB 200. The eNB 200 has a radio resource management (RRM) function, a user data (hereinafter simply referred to as "data") routing function, a measurement control function for mobility control and scheduling, and/or the like. A "cell" is used as a term that indicates a minimum unit of a radio communication area. A "cell" is also used as a term that indicates a function or resource that performs radio communication with the UE 100. One cell belongs to one carrier frequency.

In the 5G system, the base station is referred to as gNB, and the inter-base-station interface is referred to as an Xn interface. Note that the gNB can be connected to the EPC, that the eNB can be connected to the 5GC, and that the gNB and the eNB can be connected via an inter-base-station interface (Xn interface, X2 interface).

The EPC 20 includes a mobility management entity (MME) and a serving gateway (S-GW) 300. The MME performs various types of mobility control for the UE 100, and the like. The MME uses Non-Access Stratum (NAS) signaling to communicate with the UE 100, thus managing information regarding a tracking area (TA) in which the UE 100 exists. The tracking area is an area including a plurality of cells. The S-GW performs data transfer control. The MME and the S-GW are connected to the eNB 200 via an Si interface corresponding to a base station to core network interface.

In the 5G system, a core network entity that performs various types of mobility control or the like on the UE 100 is referred to as an Access and Mobility Management Function (AMF). The core network entity that performs data transfer control is referred to as a User Plane Function (UPF). The base station to core network interface is referred to as an NG interface.

Figure 2:
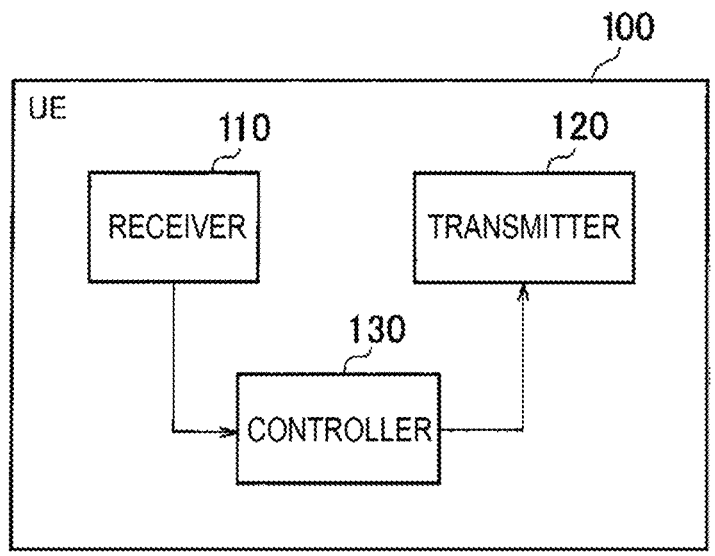
FIG. 2 is a diagram illustrating a configuration of user equipment according to an embodiment.

FIG. 2 is a diagram illustrating a configuration of the UE 100 (user equipment). The UE 100 includes a receiver 110, a transmitter 120, and a controller 130.

The receiver 110 performs various types of reception under control of the controller 130. The receiver 110 includes an antenna and a receiving unit. The receiving unit converts a radio signal received by the antenna into a baseband signal (reception signal) and outputs the signal to the controller 130.

The transmitter 120 performs various type of transmission under control of the controller 130. The transmitter 120 includes the antenna and a transmitting unit. The transmitting unit converts the baseband signal (transmission signal) to be output by the controller 130 into a radio signal and transmits the signal from the antenna.

The controller 130 performs various type of control in the UE 100. The controller 130 includes at least one processor and at least one memory. The memory stores programs to be executed by the processor and information used for processing by the processor. The processor may include a baseband processor and a Central Processing Unit (CPU). The baseband processor performs modulation/demodulation and coding/decoding of the baseband signal, and the like. The CPU executes the programs stored in the memory to perform various types of processing. The processor executes processing described below.

Figure 3:
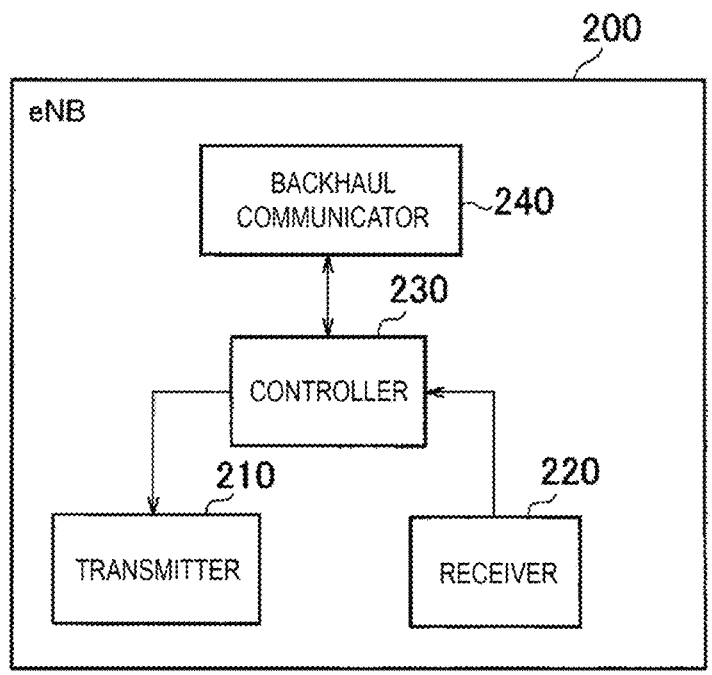
FIG. 3 is a diagram illustrating a configuration of a base station according to an embodiment.

FIG. 3 is a diagram illustrating a configuration of the eNB 200 (base station). The eNB 200 includes a transmitter 210, a receiver 220, a controller 230, and a backhaul communicator 240.

The transmitter 210 performs various types of transmission under control of the controller 230. The transmitter 210 includes an antenna and a transmitting unit. The transmitting unit converts a baseband signal (transmission signal) to be output by the controller 230 into a radio signal and transmits the signal from the antenna.

The receiver 220 performs various types of reception under control of the controller 230. The receiver 220 includes the antenna and a receiving unit. The receiving unit converts the radio signal received by the antenna into a baseband signal (reception signal) and outputs the signal to the controller 230.

The controller 230 performs various type of control in the eNB 200. The controller 230 includes at least one processor and at least one memory. The memory stores programs to be executed by the processor and information used for processing by the processor. The processor may include a baseband processor and a CPU. The baseband processor performs modulation/demodulation and coding/decoding of the baseband signal, and the like. The CPU executes the programs stored in the memory to perform various types of processing. The processor executes processing described below.

The backhaul communicator 240 is connected to a neighboring eNB or a neighboring gNB via an inter-base-station interface (X2 interface or Xn interface). The backhaul communicator 240 is connected to an MME/S-GW 300 or AMF/UPF via the base station to core network interface (Si interface or NG interface).

Figure 4:
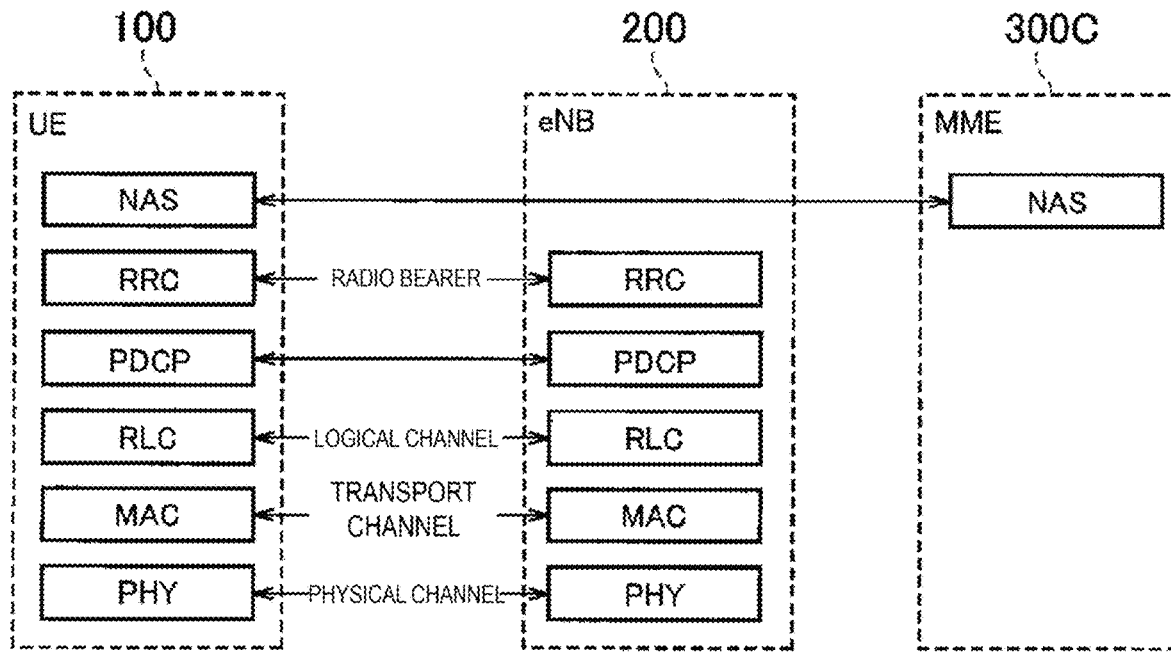
FIG. 4 is a diagram illustrating a configuration of a radio interface protocol stack according to an embodiment.

FIG. 4 is a diagram illustrating a configuration of a radio interface protocol stack in an LTE system. As illustrated in FIG. 4, the radio interface protocol is divided into the first layer to the third layer of the OSI reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer. The PHY layer, MAC layer, RLC layer, PDCP layer, and RRC layer constitute an Access Stratum (AS) layer.

The PHY layer performs coding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs priority control of data, retransmission processing by a hybrid ARQ (HARQ), random access procedure, and the like. Data and control information are transmitted between the MAC layer of the UE 100 and the MAC layer of the eNB 200 via a transport channel. The MAC layer of the eNB 200 includes a scheduler. The scheduler determines uplink and downlink transport formats (a transport block size, and a modulation and coding scheme (MCS)) and resource blocks allocated to the UE 100.

The RLC layer transmits data to the RLC layer on the receiver side using the functions of the MAC layer and PHY layer. Data and control information are transmitted between the RLC layer of the UE 100 and the RLC layer of the eNB 200 via a logical channel.

The PDCP layer performs header compression/extension and encryption/decryption.

The RRC layer is defined only in a control plane that handles control information. RRC signaling for various types of configuration is transmitted between the RRC layer of the UE 100 and the RRC layer of the eNB 200. The RRC layer controls the logical channel, the transport channel, and the physical channel in response to establishing, re-establishing, and releasing of the radio bearer. In a case where there is connection (RRC connection) between the RRC of the UE 100 and the RRC of the eNB 200, the UE 100 is in an RRC connected mode. In a case where there is no connection (RRC connection) between the RRC of the UE 100 and the RRC of the eNB 200, the UE 100 is in an RRC idle mode.

The NAS layer located upper than the RRC layer performs session management, mobility management, and the like. NAS signaling is transmitted between the NAS layer of the UE 100 and the NAS layer of the MME 300C. The UE 100 includes the functions of an application layer and the like in addition to the radio interface protocol.

In the 5G system, a Service Data Adaptation Protocol (SDAP) layer is provided above the PDCP layer in the user plane. The SDAP layer performs mapping between an IP flow that is a unit of QoS control performed by the core network and a radio bearer that is a unit of QoS control performed by an Access Stratum (AS).

Figure 5:
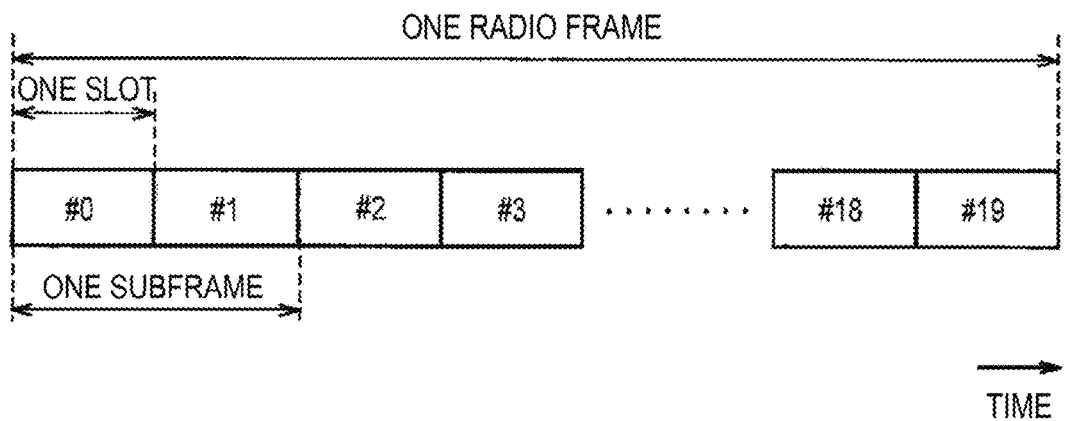
FIG. 5 is a diagram illustrating a configuration of a radio frame according to an embodiment.

FIG. 5 illustrates a configuration of a radio frame used in the LTE system. The radio frame includes 10 subframes on the time axis. Each subframe includes two slots on the time axis. Each subframe has a length of 1 ms. Each slot has a length of 0.5 ms. Each subframe includes a plurality of resource blocks (RBs) on a frequency axis. Each subframe includes a plurality of symbols on the time axis. Each resource block includes a plurality of subcarriers on the frequency axis. Specifically, 12 subcarriers and one slot constitute one RB. One symbol and one subcarrier constitute one resource element (RE). Among the radio resources (time and frequency resources) allocated to the UE 100, frequency resources can be identified by resource blocks and time resources can be identified by subframes (or slots).

In a downlink, a section of several leading symbols of each subframe is a region used as a Physical Downlink Control Channel (PDCCH) for mainly transmitting downlink control information. The remaining portion of each subframe is a region that can be used as a Physical Downlink Shared Channel (PDSCH) for mainly transmitting downlink data.

In an uplink, both end portions of each subframe in the frequency direction are regions used as a Physical Uplink Control Channel (PUCCH) for mainly transmitting uplink control information. The remaining portion of each subframe is a region that can be used as a Physical Uplink Shared Channel (PUSCH) for mainly transmitting uplink data.

Operations of Mobile Communication System

Now, operations of a mobile communication system according to an embodiment will be described. The LTE system will be described as an example. However, application to a 5G system may be allowed, and in that case, the eNB may be replaced with a gNB and the X2 interface may be replaced with an Xn interface.

(1) Overview of Conditional Handover

In a typical handover procedure, handover of the UE 100 is determined by the eNB 200. For example, in response to deterioration of a radio state between the UE 100 and the source cell and/or improvement of a radio state between the UE 100 and the target cell, the UE 100 transmits a measurement report related to the radio state to the source cell.

Note that the handover is an operation in which the serving cell of the UE 100 is switched from the source cell to the target cell. An example will be described below in which the source cell and the target cell belong to different eNBs. However, the source cell and the target cell may belong to the same eNB.

The source eNB 200 managing the source cell determines handover of the UE 100 based on a measurement report transmitted from the UE 100 and transmits a handover request including a UE context to a target eNB managing the target cell. In response to reception of a handover request acknowledgment response from the target eNB, the source eNB 200 transmits a handover command to the UE 100. In response to reception of the handover command, the UE 100 initiates handover to the target eNB and transmits a random access signal to the target eNB.

In contrast, in a procedure of conditional handover, the handover of the UE 100 is determined by the UE 100 itself. Specifically, the source eNB 200 pre-transmits a handover request to a candidate eNB that manages a candidate cell being a candidate for the target cell. In this regard, the number of the candidate eNBs is not limited to one but may be plural. Thus, a plurality of the candidate eNBs may receive the handover request.

The source eNB 200 pre-transmits a handover command to the UE 100. After receiving the handover command, the UE 100 suspends the handover until a trigger condition is satisfied, and when the trigger condition is satisfied, initiates the handover and transmits a random access signal to one candidate eNB.

In such conditional handover, the source eNB 200 does not determine handover based on the measurement report, and the UE 100 itself determines handover. Thus, even in a case where the radio state between the UE 100 and the source eNB 200 is unstable, the handover is immediately performed according to the radio state, which thus can enhance the reliability (robustness) of the handover.

In an embodiment, the UE 100 receives, from the source cell (source eNB 200), a handover command including a list of candidate cells being candidates for the target cell (the list is hereafter referred to as a cell list) and trigger conditions specified for the respective candidate cells in the cell list. In a case where a trigger condition corresponding to a particular candidate cell in the cell list included in the received handover command is satisfied, the UE 100 is handed over to the particular candidate cell for which the trigger condition is satisfied.

Thus, in an embodiment, the handover command includes the cell list. A method is conceivable in which the source eNB 200 predicts the movement direction of the UE 100 and determines only one destination cell to be a candidate cell. However, such a method is problematic in that a wrong prediction prevents conditional handover from being achieved. In an embodiment, the cell list is included in the handover command, and thus such a problem is easily solved.

By specifying the trigger condition for each candidate cell, the trigger condition can be specified in fine detail in accordance with the attributes of the candidate cell (e.g., the type and size of the cell).

Note that the source eNB 200 is hereinafter designated as "source eNB 200S", and the candidate eNB is hereinafter designated as "candidate eNB 200T".

(2) Example of Operation Sequence

Figure 6:
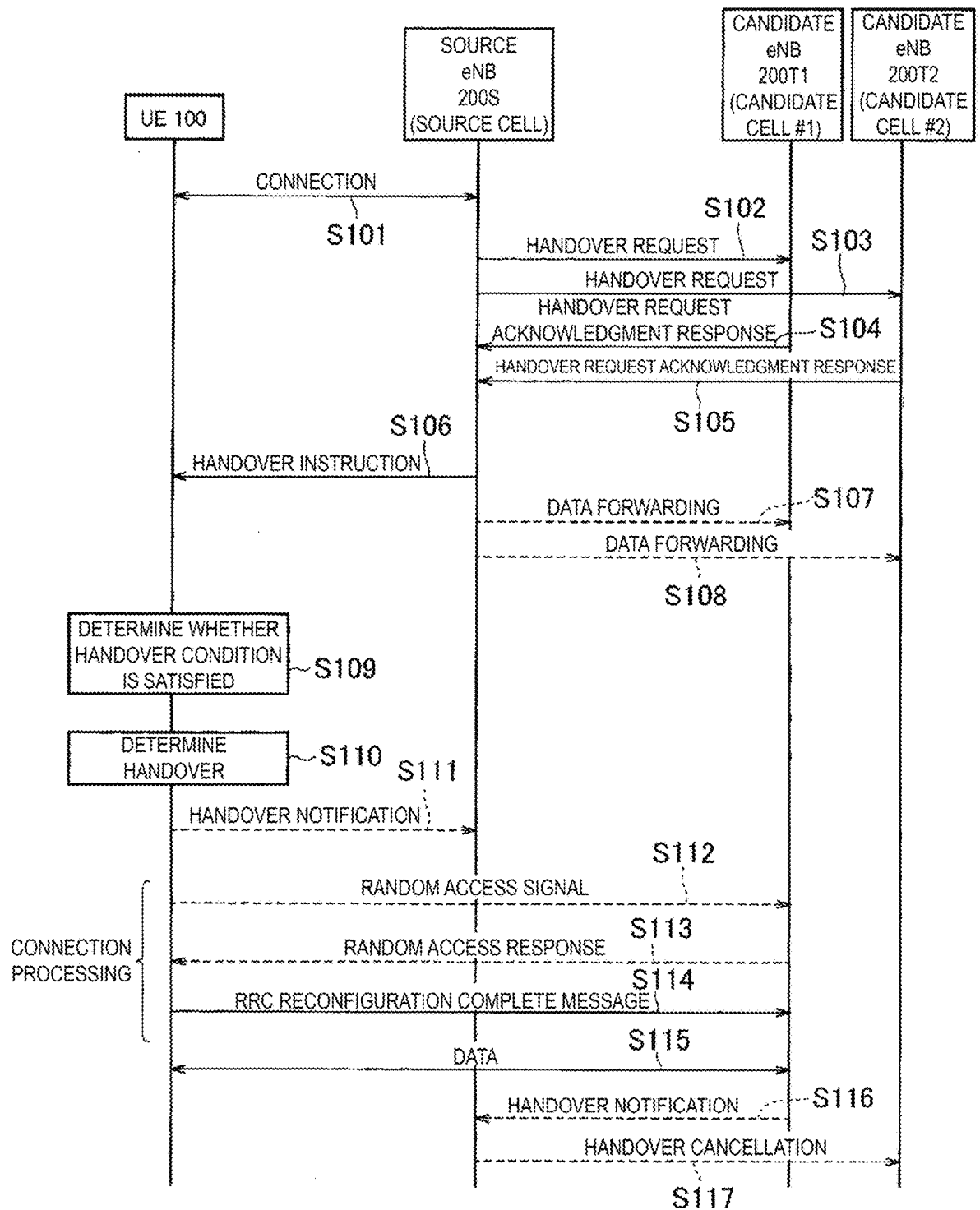
FIG. 6 is a diagram illustrating an example of an operation sequence of a mobile communication system according to an embodiment.

FIG. 6 is a diagram illustrating an example of an operation sequence of the mobile communication system according to an embodiment. Note that signaling indicated by a dashed line in FIG. 6 is not required.

As illustrated in FIG. 6, in step S101, the UE 100 in an RRC connected mode establishes radio connection (RRC connection) with the cell (source cell) of the source eNB 200S.

The source eNB 200S determines a candidate cell (candidate eNB 200T) being a candidate for the target cell in a case of handover of the UE 100. The candidate eNB 200T may be an adjacent eNB to the source eNB 200S. The source eNB 200S may determine the candidate eNB 200T when the UE 100 is connected to a cell of the source eNB 200S, and transmit the handover request to the candidate eNB 200T. The source eNB 200S may transmit the handover request to a plurality of eNBs (a plurality of candidate eNBs). In this regard, it is assumed that the source eNB 200S determines the cell of the candidate eNB 200T1 and the cell of the candidate eNB 200T2 to be candidate cells. The cell of the candidate eNB 200T1 is hereinafter referred to as candidate cell #1, and the cell of the candidate eNB 200T2 is hereinafter referred to as candidate cell #2.

In step S102, the source eNB 200S transmits a handover request message for conditional handover to the candidate eNB 200T1 over the inter-base-station interface (X2 interface).

In step S103, the source eNB 200S transmits the handover request message for conditional handover to the candidate eNB 200T2 over the inter-base-station interface (X2 interface).

The handover request message includes a UE context. The handover request message may be a new dedicated message for conditional handover. Alternatively, the handover request message may be an existing handover request message including information (information elements) indicating conditional handover.

Each of the candidate eNB 200T1 and the candidate eNB 200T2 receives the handover request message from the source eNB 200S, and holds the UE context included in the handover request message.

In step S104, the candidate eNB 200T1 transmits a handover request acknowledgment response (Ack) message to the source eNB 200S over the X2 interface.

The handover request Ack message transmitted by the candidate eNB 200T1 includes a radio communication configuration (RRC Configuration) determined by the candidate eNB 200T1. The radio communication configuration is a configuration to be applied to radio communication with the candidate eNB 200T1 in a case where the UE 100 is handed over to the candidate eNB 200T1. The radio communication configuration may include a layer-by-layer configuration. For example, the radio communication configuration may include at least one of a PDCP configuration, an RLC configuration, a MAC configuration, and a PHY configuration.

The handover request Ack message transmitted by the candidate eNB 200T1 may include information for the UE 100 to omit the random access procedure for the candidate eNB 200T1. Such information includes timing advance information and/or uplink radio resource information. The timing advance information is information indicating a timing advance value (TA value) to be applied when the UE 100 performs uplink transmission to the candidate eNB 200T1. The uplink radio resource information is information indicating an uplink radio resource (time and frequency resources) to be used when the UE 100 performs uplink transmission to the candidate eNB 200T1. The uplink radio resource information may be referred to as an uplink grant (UL grant). The uplink radio resource information may further include information indicating a modulation/coding scheme (MCS) to be applied to the uplink transmission.

In step S105, the candidate eNB 200T2 transmits a handover request Ack message to the source eNB 200S over the X2 interface.

The handover request Ack message transmitted by the candidate eNB 200T2 may include information (information elements) similar to the information in the handover request Ack message transmitted by the candidate eNB 200T1. In other words, the handover request Ack message transmitted by the candidate eNB 200T2 includes the radio communication configuration determined by the candidate eNB 200T2. The handover request Ack message transmitted by the candidate eNB 200T2 may include timing advance information and/or uplink radio resource information as information for the UE 100 to omit the random access procedure for the candidate eNB 200T2.

The source eNB 200S receives these handover request Ack messages to acquire the radio communication configuration from each candidate eNB 200. The source eNB 200S acquires the timing advance information and/or the uplink radio resource information.

In step S106, the source eNB 200S transmits, to the UE 100, a handover command (e.g., an RRC connection reconfiguration message) including information (information elements) related to conditional handover.

Figure 7:
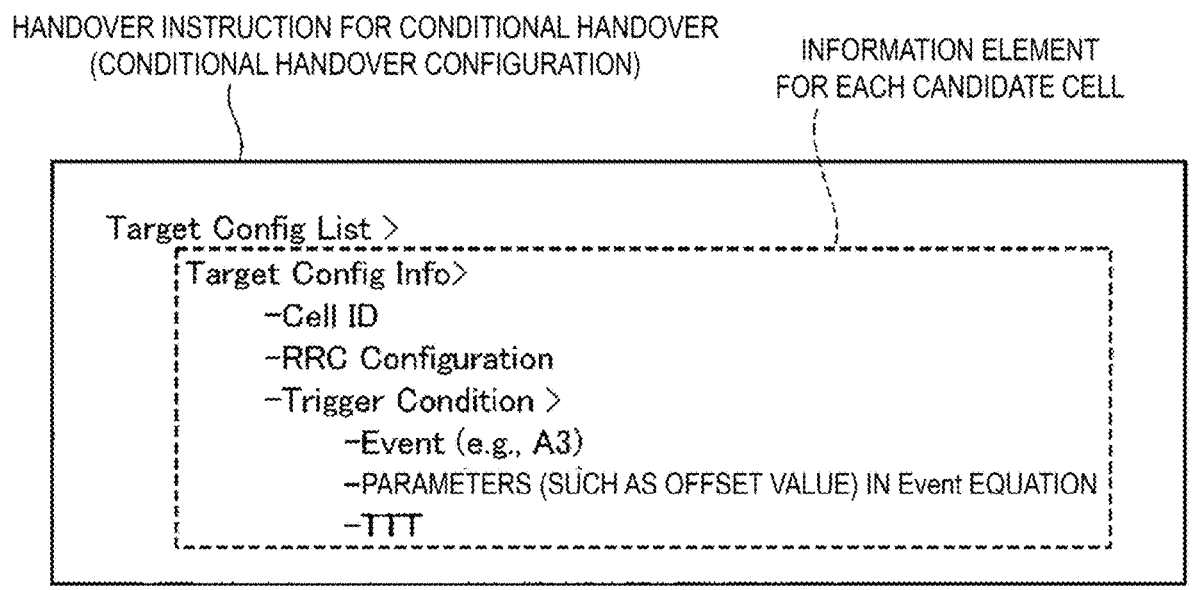
FIG. 7 is a diagram illustrating an example of information (information elements) included in a handover command according to an embodiment.

FIG. 7 is a diagram illustrating an example of information (information elements) included in a handover command according to an embodiment. The handover command for conditional handover may be referred to as a conditional handover configuration or a target configuration.

As illustrated in FIG. 7, the handover command transmitted to the UE 100 by the source eNB 200S includes a "Target Config. List" that is a list of configuration information for each candidate cell. In this operation example, "Target Config. List" includes "Target Config Info" corresponding to the candidate cell #1 and "Target Config Info" corresponding to the candidate cell #2.

"Target Config. List" includes the "Target Config Info", including configuration information for each candidate cell. "Target Config Info" includes "Cell ID" that is the identifier (e.g., a physical cell identifier) of a corresponding candidate cell, a radio communication configuration (RRC Configuration) for the corresponding candidate cell, and a trigger condition for handover to the corresponding candidate cell. "Target Config Info" may further include timing advance information and/or uplink radio resource information for each candidate cell. In a case where these pieces of information are included, the handover command may further include information indicating that the random access procedure can be omitted for the corresponding candidate cell. Furthermore, the handover command may further include information specifying a period of time (a validity period) when the handover command is valid.

The trigger condition includes an event for a trigger (Event), parameters for an event equation, and a Time To Trigger (TTT).

For the event (Event), an event equation is specified that indicates, for example, deterioration of a radio state between the UE 100 and the source eNB 200 (source cell) and/or improvement of a radio state between the UE 100 and the candidate eNB (candidate cell). The event (Event) may be expressed by an identifier indicating an event type (e.g., event A3). As the event type, any of the following may be configured.

Event A1 (Serving becomes better than threshold)
Event A2 (Serving becomes worse than threshold)
Event A3 (Neighbour becomes offset better than PCell/PSCell)
Event A4 (Neighbour becomes better than threshold)
Event A5 (PCell/PSCell becomes worse than threshold1 and neighbour becomes better than threshold2)
Event A6 (Neighbour becomes offset better than SCell)
Event B1 (Inter RAT neighbour becomes better than threshold)
Event B2 (PCell becomes worse than threshold1 and inter RAT neighbour becomes better than threshold2).

The parameters for the event equation include such as a first threshold to be compared with the radio state of the source cell or an offset value applied to the first threshold, and a second threshold compared with the radio state of the candidate cell or an offset value applied to the second threshold. The radio state may be, for example, a received reference signal quality (such as RSRP, RSRQ, and/or RS-SINR, etc.) and may be the number of packet retransmissions (such as the number of RLC retransmissions).

The Time To Trigger (TTT) is the duration for which a state with the event (Event) satisfied is to be maintained to trigger handover. Specifically, by triggering handover when the state with the event (Event) satisfied lasts for the duration TTT, the handover can be prevented from being triggered by a temporary fluctuation in radio state, allowing reliability to be enhanced.

In this regard, instead of the value of the TTT, the index value (pointer value) of the TTT may be included in "Target Config Info." For example, in a case where the TTT value is prepared as (0, 1, 2, 3), the TTT of candidate cell 1 may be designated as the second TTT, and the TTT of candidate cell 2 may be designated as the fourth TTT.

Note that the source cell (source eNB 200S) sets, as the value of each TTT, a value smaller than an RLF occurrence timing (T310: out of sync, T312: Re-establishment, RLC retransmission upper limit, RACH retransmission upper limit).

With reference back to FIG. 6, the sequence illustrated in FIG. 6 will be continuously described. In steps S107 and S108, the source eNB 200S initiates transfer of replication of downlink data for the UE 100 to the candidate eNB 200T1 and candidate eNB 200T2 that manage the candidate cells in the cell list, before the UE 100 is handed over. In other words, the source eNB 200S initiates a transfer processing for transferring replication of the downlink data (so-called data forwarding). Note that the data forwarding may follow the connection processing of the UE 100.

In step S109, in response to reception of the handover command from the source eNB 200S, the UE 100 determines whether or not any of the trigger conditions included in the received handover command have been satisfied. For example, by measuring the radio state of the source eNB 200S (source cell) and each candidate eNB 200T and comparing the radio state to a threshold, the UE 100 determines whether or not the trigger condition has been satisfied.

Specifically, the UE 100 applies parameter values included in "Target Config Info" to the event included in the "Target Config Info". When an event occurs to which the parameter value is applied and the state with this event satisfied lasts for the duration TTT, the handover trigger condition for the candidate cell having the "Cell ID" included in the "Target Config Info" is satisfied.

In step S110, in a case where the trigger condition corresponding to a particular candidate cell in the cell list is satisfied, the UE 100 determines that UE 100 is to access (connection processing) the particular candidate cell for which the trigger condition is satisfied. In this regard, the following description will be given on the assumption that the trigger condition corresponding to the candidate eNB 200T1 (candidate cell #1) is satisfied.

In step S111, the UE 100 may transmit, to the source eNB 200S, a notification (handover notification) indicating execution of handover. Based on the notification, the source eNB 200S recognizes that the UE 100 is to be handed over. The handover execution notification may include information indicating a cell selected by the UE 100 as a handover destination.

In step S112, the UE 100 initiates the random access procedure (connection processing) on the candidate cell #1 (candidate eNB 200T1) selected as the handover destination, and transmits a random access signal to the cell.

In step S113, the candidate eNB 200T1 calculates timing advance based on the random signal, and determines an uplink radio resource to be allocated to the UE 100. Then, the candidate eNB 200T1 transmits, to the UE 100, a random access response including the information of the calculated timing advance and the determined uplink radio resource.

In this regard, the timing advance information and/or the uplink radio resource information (UL grant) corresponding to the candidate cell #1 may be included in the handover command. In this case, the UE 100 may omit the random access procedure for the candidate cell #1 (candidate eNB 200T1), that is, the transmission of the random access signal (step S112) and the reception of the random access response (step S113). In this regard, the following description will be given on the assumption that the UE 100 has omitted the random access procedure.

In step S114, in a case of being handed over to the candidate cell #1 (candidate eNB 200T1), the UE 100 uses the timing advance information and/or the uplink radio resource information corresponding to the candidate cell #1 to omit transmission of the random access signal to the candidate cell #1 and to transmit the uplink message to the candidate cell #1. In this regard, the uplink message may be an RRC reconfiguration complete message, which is a type of the RRC message. As a result, the connection processing between the UE 100 and the candidate cell #1 (candidate eNB 200T1) is completed and the handover is completed.

In step S115, once the handover is completed, the UE 100 transmits and receives data to and from the candidate cell #1 (candidate eNB 200T1) using the radio communication configuration included in the handover command and corresponding to the candidate cell #1 (candidate eNB 200T1). The candidate eNB 200T1 may transmit, to the UE 100, downlink data transferred in advance from the UE 100 by data forwarding.

In step S116, the candidate eNB 200T1 may transmit, to the source eNB 200S over the X2 interface, a handover notification indicating that the UE 100 has been handed over (connected) to the candidate eNB 200T1.

In step S117, the source eNB 200S may notify the candidate eNB 200T2 of handover cancellation in response to reception of the handover notification from the candidate eNB 200T1. In response to reception of the handover cancellation, the candidate eNB 200T2 may discard the UE context included in the handover request (step S103) and held by the candidate eNB 200T2.

As described above, in the handover control method for performing conditional handover of the UE 100 from the source cell to which the UE 100 is connected to the target cell, the UE 100 receives, from the source cell, the handover command including the list of candidate cells being candidates for the target cell and the trigger conditions specified for the respective candidate cells in the list. When the trigger condition corresponding to the particular candidate cell (candidate cell #1) in the list included in the received handover command is satisfied, the UE 100 performs a handover to the specific candidate cell (candidate cell #1) for which the trigger condition has been satisfied. In this way, by specifying the trigger condition for each candidate cell, the trigger condition can be specified in fine detail in accordance with the attributes of the candidate cell (e.g., the type and size of the cell).

(3) Connection Failure in Conditional Handover

The UE may detect connection failure after receiving the handover command for conditional handover. The network acquires and analyzes information related to such connection failure and reflects the analysis results in the subsequent conditional handover, so that possible subsequent connection failure can be suppressed.

Figure 8:
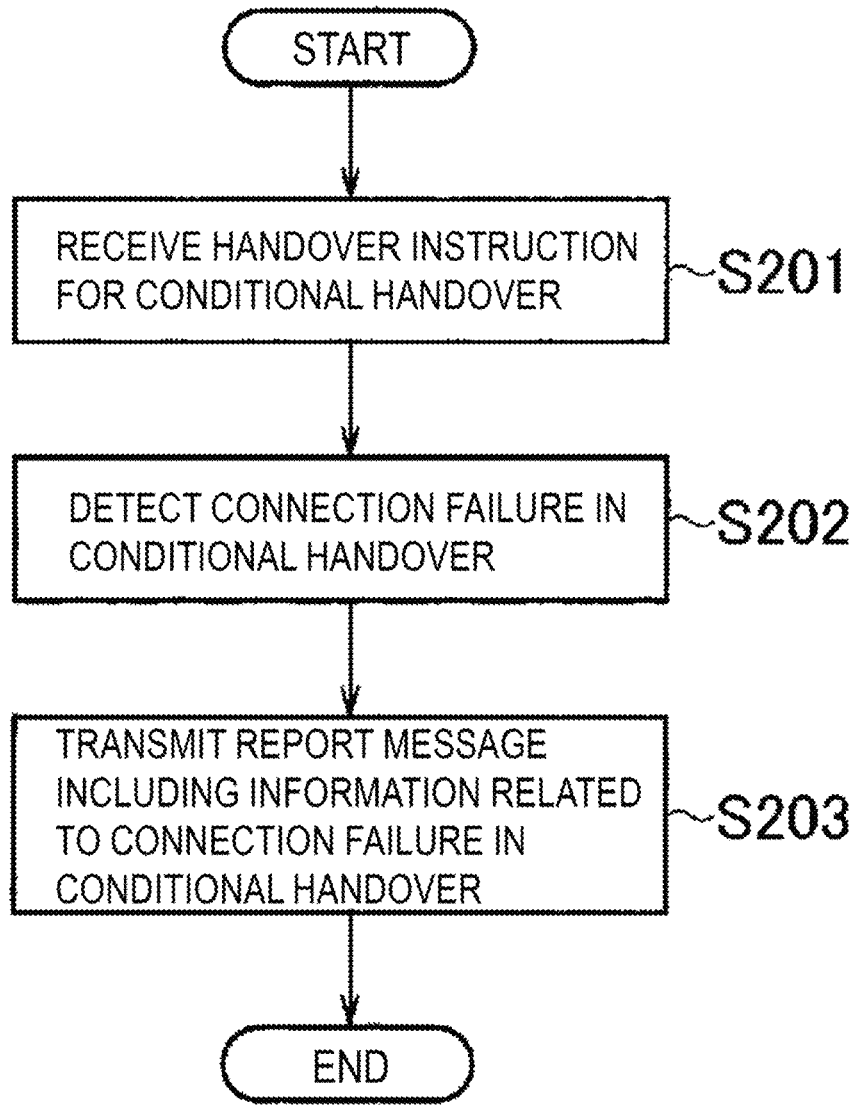
FIG. 8 is a diagram illustrating an example of UE operations related to connection failure in conditional handover according to an embodiment.

FIG. 8 is a diagram illustrating an example of operations of the UE 100 associated with connection failure in conditional handover.

As illustrated in FIG. 8, in step S201, the UE 100 receives a handover command for conditional handover from the source cell (source eNB 200S).

In step S202, the UE 100 detects connection failure. The connection failure includes, for example, radio link failure (RLF) during connection to the source cell, and access failure (handover failure) at a time of access to a candidate cell for which the trigger condition is satisfied.

In response to detection of RLF during connection to the source cell, the UE 100 attempts to re-establish the RRC connection while maintaining the RRC connected mode. Here, the UE 100 stores failure information related to the RLF.

Moreover, in response to detection of the access failure to the candidate cell, the UE 100 attempts to re-establish the RRC connection while maintaining the RRC connected mode. In this regard, the UE 100 stores failure information related to the access failure. Alternatively, in response to detection of access failure to one candidate cell, the UE 100 may attempt to access another cell specified in the handover command while maintaining the RRC connected mode.

Specifically, the UE 100 accesses one candidate cell, and in a case where the access is successful (in a case where connection is established), the UE 100 accesses no other candidate cell. In other words, a conditional handover command to another candidate cell is cancelled (Target Config Info is discarded). On the other hand, in a case where the access to the one candidate cell fails, the UE 100 accesses another candidate cell using the "Target Config Info" for such another candidate cell.

Note that in a case where the RRC connection re-establishment is successful, the UE 100 connects to a cell to which connection is to be re-established while maintaining the RRC connected mode. On the other hand, in a case where the RRC connection re-establishment fails, the UE 100 transitions from the RRC connected mode to the RRC idle mode. After transitioning to the RRC idle mode, the UE 100 retains the failure information until the UE 100 connects to the cell and transitions to RRC connected mode.

In step S203, the UE 100 transmits a report message including the failure information to the eNB 200 managing the cell to which the UE 100 is connected. Such a report message may be referred to as an RLF Report.

As described above, the handover command for conditional handover may include the identifiers of a plurality of candidate cells being candidates for the target cell. The report message transmitted by the UE 100 may include at least one of the identifiers of the plurality of candidate cells.

The candidate cells the identifiers of which are included in the report message may be all of the candidate cells specified in the handover command for conditional handover. Alternatively, the candidate cells the identifiers of which are included in the report message may be only one or a plurality of candidate cells for which the trigger condition is satisfied and in which connection failure has been detected at a time of access by the UE 100, among the candidate cells specified in the handover command for conditional handover.

For example, the report message may include a list of the identifier of at least one candidate cell (hereinafter referred to as a "failed cell list") for which the trigger condition is satisfied and in which connection failure has been detected at a time of access by the UE 100.

The report message may also include time information associated with each of the candidate cells in the failed cell list. The time information is information used to identify the time when occurrence of connection failure to the corresponding candidate cell is detected.

FIG. 9 is a diagram illustrating an example of a failed cell list included in a report message.

Figure 9A:
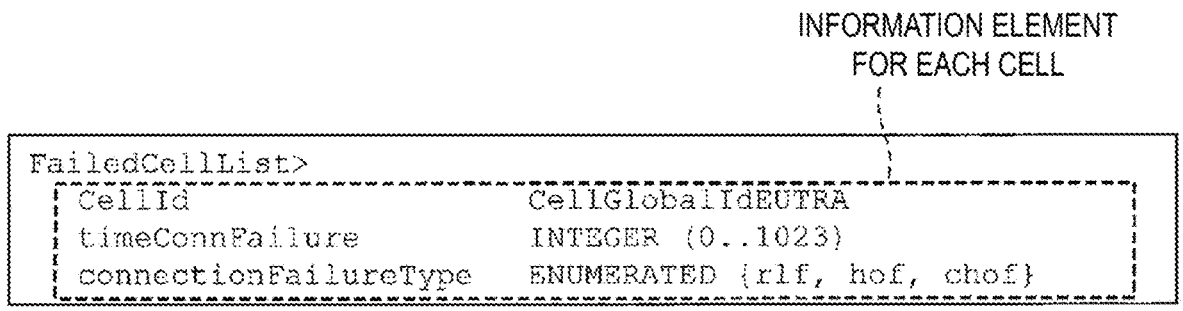
FIG. 9A is a diagram illustrating a first example of a failed cell list included in a report message according to an embodiment.

In the first example illustrated in FIG. 9A, the failed cell list (FailedCellList) includes, for each cell in which connection failure has been detected, the cell identifier (CellId) of the cell, time information (timeConnFailure) for the cell, and the type of connection failure (connectionFailureType). The time information (timeConnFailure) is information indicating an elapsed time since the time of occurrence of the access failure. The type of connection failure (connectionFailureType) is selected from among three types: radio link failure (rlf), handover failure (hof), conditional handover failure (chof).

Figure 9B:
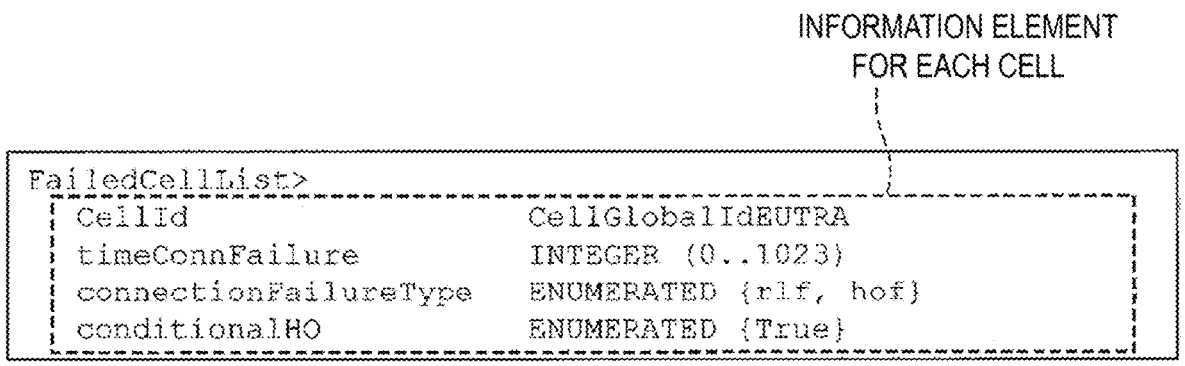
FIG. 9B is a diagram illustrating a second example of a failed cell list included in a report message according to an embodiment.

In the second example illustrated in FIG. 9B, the failed cell list (FailedCellList) includes, for each cell in which connection failure has been detected, the cell identifier (CellId) of the cell, time information (timeConnFailure) for the cell, the type of the connection failure (connectionFailureType), and conditional handover information (conditionalHO). True is configured in the conditional handover information (conditionalHO) in a case of connection failure in conditional handover.

Figure 10:
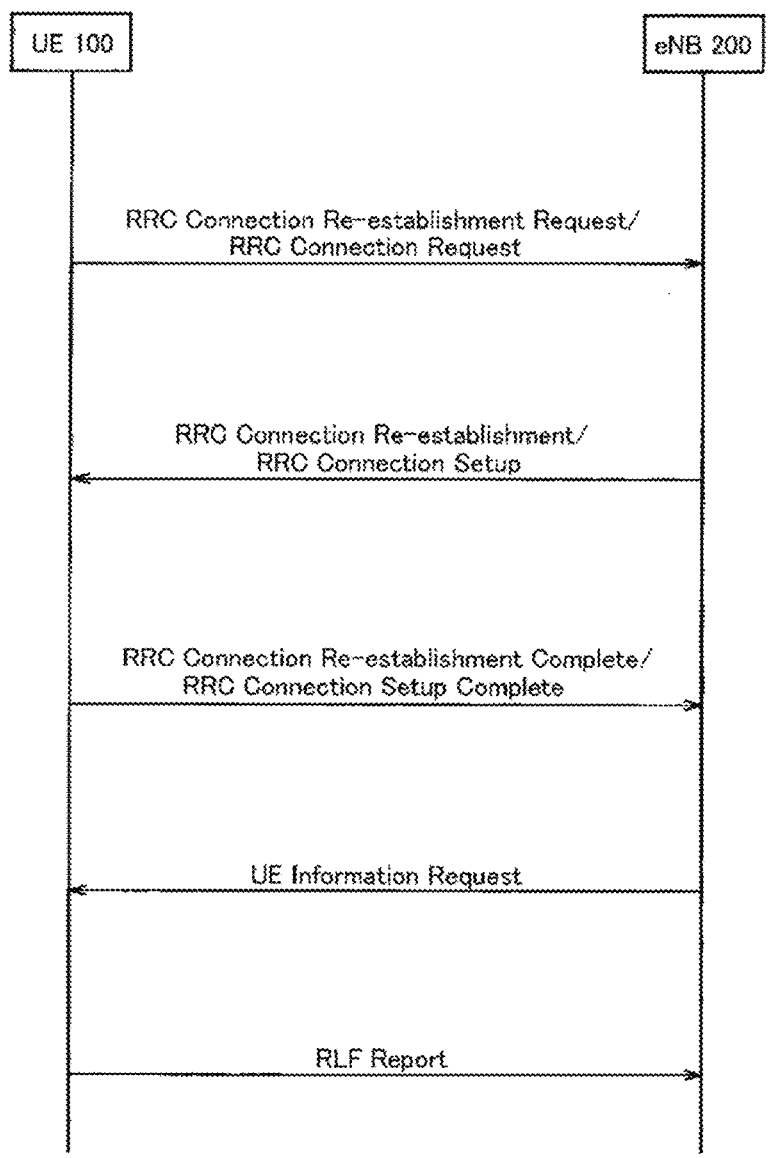
FIG. 10 is a diagram illustrating an example of step S203 in FIG. 8.

FIG. 10 is a diagram illustrating an example of step S203 in FIG. 8.

As illustrated in FIG. 10, in a case where RRC connection re-establishment processing is executed, 1) an RRC Connection Re-establishment Request message is transmitted from the UE 100 to the eNB 200, 2) an RRC Connection Re-establishment message is transmitted from the eNB 200 to the UE 100, 3) an RRC Connection Re-establishment Complete message is transmitted from the UE 100 to the eNB 200, 4) a UE Information Request message is transmitted from the eNB 200 to the UE 100, and 5) a RLF Report is transmitted from the UE 100 to the eNB 200.

On the other hand, when the RRC connection processing is performed, 1) the RRC Connection Request message is transmitted from the UE 100 to the eNB 200, 2) the RRC Connection Setup message is transmitted from the eNB 200 to the UE 100, 3) the RRC Connection Setup Complete message is transmitted from the UE 100 to the eNB 200, 4) the UE Information Request message is transmitted from the eNB 200 to the UE 100, and 5) the RLF Report is transmitted from the UE 100 to the eNB 200.

In this regard, when the message in 1) described above is transmitted from the UE 100 to the eNB 200, a message including "Conditional Handover Failure" may be transmitted as an information element indicating a reason for RRC connection or re-establishment.

When the message in 3) described above is transmitted from the UE 100 to the eNB 200, a message may be transmitted that includes an information element indicating that the message includes connection failure information. The information element may be an information element specifically indicating connection failure in conditional handover.

(4) Selection of Access Destination Cell

For the handover command for conditional handover illustrated in FIG. 7, an example has been described in which the duration (TTT) is individually configured for each candidate cell. However, for the duration (TTT), one value may be configured for all the candidate cells.

For example, Event A2 (Serving becomes worse than threshold) or Event A3 (Neighbour becomes offset better than PCell/PSCell) may be specified for all the candidate cells. In this case, in a case where the radio state of the serving cell is degraded, the trigger conditions for two or more candidate cells may be satisfied simultaneously. In such a case, the UE 100 selects any candidate cell from among the two or more candidate cells, and accesses the candidate cell selected.

Figure 11:
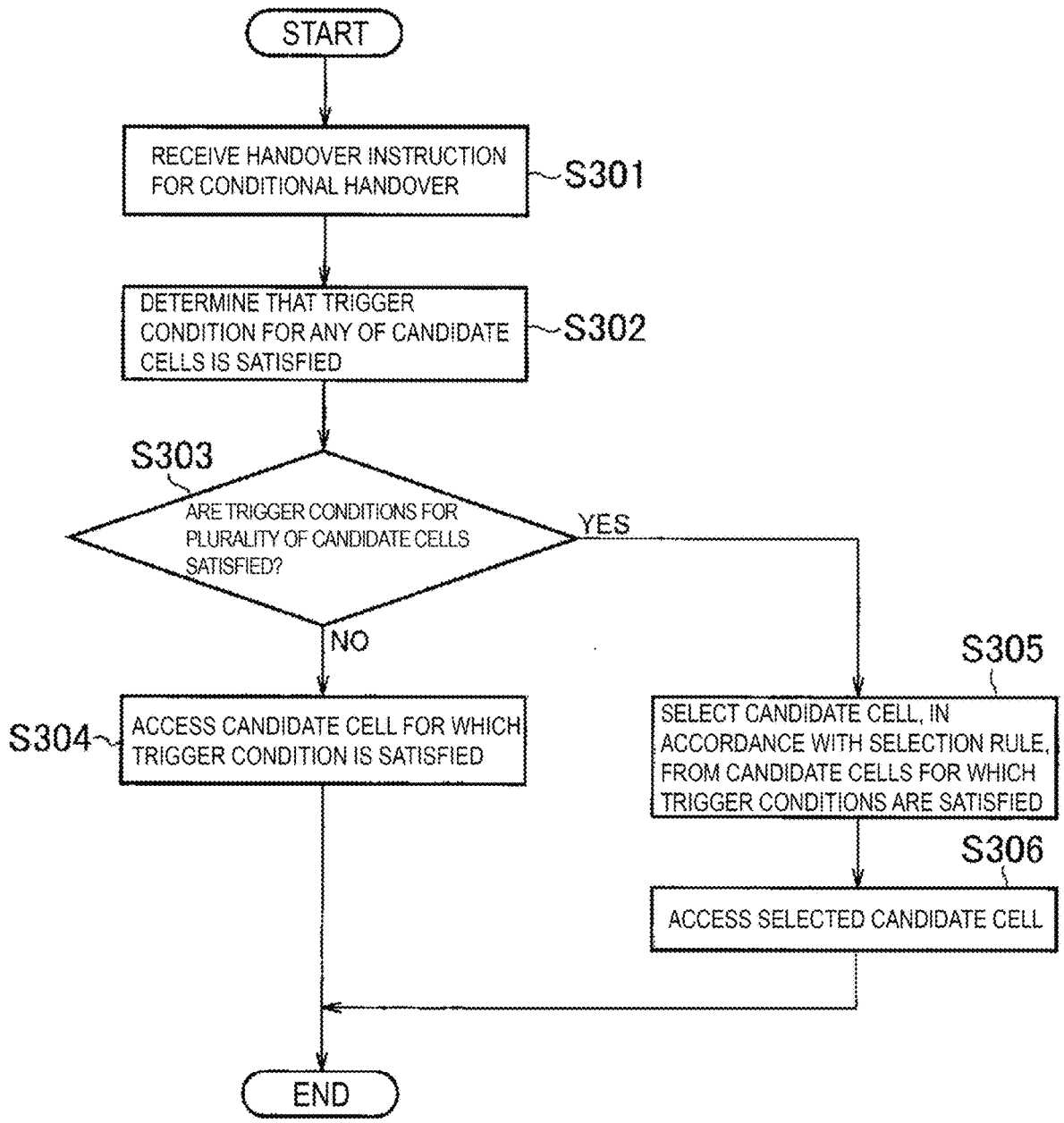
FIG. 11 is a diagram illustrating an example of UE operations related to selection of an access destination cell according to an embodiment.

FIG. 11 is a diagram illustrating an example of operations of the UE 100 regarding selection of an access destination cell.

As illustrated in FIG. 11, in step S301, the UE 100 receives, from the source cell (source eNB 200S), a handover command including the identifiers of a plurality of candidate cells being candidates for the target cell and trigger conditions for handover (see FIG. 7).

In step S301, the UE 100 determines that the trigger condition for any of the candidate cells is satisfied. Specifically, in a case where, for any of the candidate cells, the state with the event satisfied lasts for the duration TTT, the UE 100 determines that the trigger condition for the candidate cell is satisfied.

In step S303, the UE 100 checks whether or not the trigger conditions for two or more candidate cells of the plurality of candidate cells specified by the handover command are satisfied.

In a case where the trigger condition for only one candidate cell of the plurality of candidate cells specified by the handover command is satisfied (step S303: NO), in step S304, the UE 100 accesses the one candidate cell.

On the other hand, in a case where the trigger conditions for only two or more candidate cells of the plurality of candidate cells specified by the handover command are satisfied (step S303: YES), in step S305, the UE 100 uses a predetermined selection rule to select, from among the two or more candidate cells, a candidate cell to be accessed by the UE 100. Then, in step S306, the UE 100 accesses the selected candidate cell.

In the selection processing in step S305, each of the two or more candidate cells for which the trigger condition is satisfied is associated with access priority. Predetermined selection rule is a rule that a candidate cell is selected in decreasing order of the access priority.

The access priority may be determined by the source eNB 200S managing the source cell. When the source eNB 200S determines the access priority, the load status of each candidate cell is taken into account, allowing a cell under low load to be prioritized.

Figure 12:
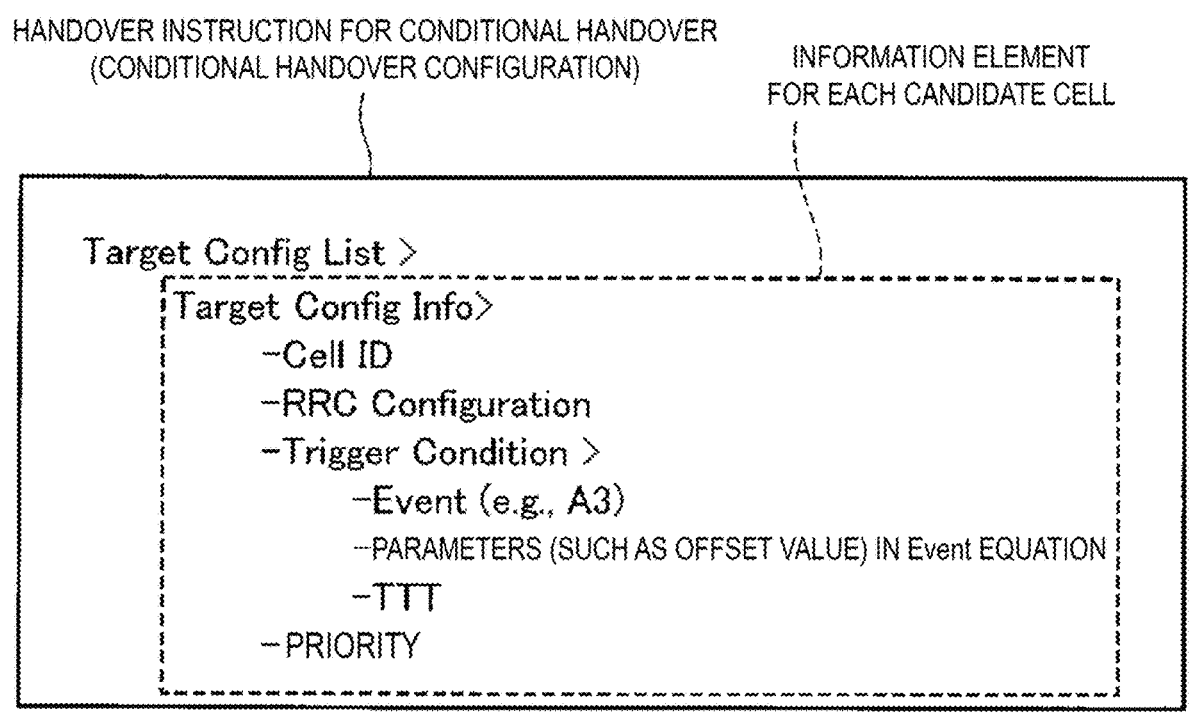
FIG. 12 is a diagram illustrating another example of information (information elements) included in a handover command according to an embodiment.

For example, as illustrated in FIG. 12, the priority of each candidate cell is explicitly specified by the source eNB 200S. Alternatively, the priority of each candidate cell is implicitly specified by the source eNB 200S based on the sorting order of candidate cells in the list of candidate cells (Target Config. List). In this case, the UE 100 selects the cells in order, for example, from top to bottom of the entries of the configuration (List). The access priority may be specified for each carrier frequency to which the candidate cell belongs.

The access priority may be determined by the UE 100 according to the radio state or carrier frequency of the candidate cell. For example, the UE 100 may select a cell in the best radio state (the cell with the best RSRP, RSRQ, or SINR). The UE 100 may preferentially select an Intra-frequency cell (i.e., a cell belonging to the same carrier frequency as that of the current serving cell) or may preferentially select an Inter-frequency cell (i.e., a cell belonging to a carrier frequency different from that of the current serving cell).

The access priority may optionally be determined by the UE 100. For example, the UE 100 may sort the cell IDs in the list of candidate cells (Target Config. List) to select the first or last cell. Alternatively, the UE 100 may randomly select a cell ID from the list of candidate cells (Target Config. List).

Note that which of the above-described priorities is to be used may be specified by the source eNB. For example, whether to apply each priority may be determined according to the presence of each of the above-described information elements. The above-described priorities may be used in combination. For example, in a case where a plurality of cells have the same access priority, from among these cells, a cell in the best radio state may be selected.

The use of the priority after the trigger condition is satisfied has been described. However, the priority as described above may be used before the trigger condition is satisfied. For example, the order in which the radio states corresponding to the events are measured (priority) may be specified, or the order in which the trigger condition is determined (priority) may be specified.

OTHER EMBODIMENTS

In a case where RLF occurs in conjunction with the source eNB, the UE 100 with conditional handover configured may be handed over as in the case of interruption processing, regardless of the event condition for the conditional handover. For example, in a case where Event A3 is configured as a trigger condition, the RSRP of the source eNB is in a good state (that is, condition A3 is not satisfied), but the number of RLC retransmissions for the source eNB may reach an upper limit. In such a case, the UE 100 with conditional handover configured triggers handover regardless of the configured trigger condition. Alternatively, the handover may be triggered by considering the RSRP of the source eNB to be extremely low, for example, to be approximately −200 dBm.

Alternatively, in a case where RLF occurs in conjunction with the source eNB, the UE 100 with conditional handover configured may initiate connection re-establishment processing, and at the time of connection re-establishment processing, preferentially select the candidate cell for conditional handover as a cell to which the connection is to be re-established.

A program may be provided that causes a computer to execute the processing performed by the UE 100 (or the eNB 200). The program may be recorded in a computer readable medium. Use of a computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for performing the processing performed by the UE 100 (or the eNB 200) may be integrated, and at least a part of the UE 100 (or the eNB 200) may be configured as a semiconductor integrated circuit (chip set, SoC).

An embodiment has been described above in detail with reference to the drawings; however, specific configurations are not limited to those described above, and various design modifications can be made without departing from the gist of the present disclosure.

The invention claimed is:

1. A handover control method for performing conditional handover of user equipment from a source cell to which the user equipment is connected to a target cell, the handover control method comprising:
   receiving, by the user equipment, from the source cell, an RRC message for handover, the RRC message including identifiers of a plurality of candidate cells being candidates for the target cell; and
   transmitting, by the user equipment, a report message including information related to a radio link failure detected in the source cell, to a cell to which the user equipment connects after the radio link failure, wherein
   the report message includes the identifiers of all the candidate cells included in the RRC message.

2. The handover control method according to claim 1, wherein:
   the RRC message includes at least one of trigger condition from among a plurality of trigger conditions for triggering the handover,
   each of the trigger conditions includes an event identifier indicating a predetermined event for triggering the handover and a duration for which a state with the predetermined event satisfied is to be maintained to trigger the handover, and
   the method further comprises, in a case where the trigger conditions for two or more candidate cells of the plurality of candidate cells are satisfied, selecting, by the user equipment, from among the two or more candidate cells, a candidate cell to be accessed by the user equipment.

3. The handover control method according to claim 1, wherein the report message includes time information related to a time of detection of the radio link failure.

4. A user equipment comprising:
   a processor and a memory coupled to the processor, the processor configured is configured to:
   receive, from a source cell, an RRC message for handover, the RRC message including identifiers of a plurality of candidate cells being candidates for a target cell; and
   transmit a report message including information related to a radio link failure detected in the source cell, to a cell to which the user equipment connects after the radio link failure, wherein
   the report message includes the identifiers of all the candidate cells included in the RRC message.

5. A chipset for controlling a user equipment, the chipset configured to execute processes of:
   receiving, from a source cell, an RRC message for handover, the RRC message including identifiers of a plurality of candidate cells being candidates for a target cell; and
   transmitting a report message including information related to a radio link failure detected in the source cell, to a cell to which the user equipment connects after the radio link failure, wherein
   the report message includes the identifiers of all the candidate cells included in the RRC message.

6. A non-transitory computer-readable medium comprising, stored thereupon, computer program instructions for execution by a user equipment, the program instructions being configured to cause the user equipment to execute processing of:
   receiving, from a source cell, an RRC message for handover, the RRC message including identifiers of a plurality of candidate cells being candidates for a target cell; and
   transmitting a report message including information related to a radio link failure detected in the source cell, to a cell to which the user equipment connects after the radio link failure, wherein
   the report message includes the identifiers of all the candidate cells included in the RRC message.

7. A system comprising:
   a user equipment configured to:
   receive, from a source cell, an RRC message for handover, the RRC message including identifiers of a plurality of candidate cells being candidates for a target cell; and
   transmit a report message including information related to a radio link failure detected in the source cell, to a cell to which the user equipment connects after the radio link failure, wherein
   the report message includes the identifiers of all the candidate cells included in the RRC message.

* * * * *